United States Patent [19]

Stowe

[11] 4,149,566
[45] Apr. 17, 1979

[54] ELASTOMERIC TEST CUP FOR TUBING PRESSURE TESTING

[75] Inventor: Milton G. Stowe, Dallas, Tex.

[73] Assignee: WPC, Inc., Midland, Tex.

[21] Appl. No.: 827,480

[22] Filed: Aug. 25, 1977

[51] Int. Cl.² .................. F16L 55/12; G01M 3/28
[52] U.S. Cl. .................................. 138/90; 73/49.8;
138/91; 166/202; 277/212 C
[58] Field of Search ............... 73/49.8; 138/89, 90,
138/91, 93; 220/240; 277/188 A, 205, 212 C;
92/240, 241, 254; 166/202

[56] References Cited

U.S. PATENT DOCUMENTS

| 2,130,030 | 9/1938 | Richardson | 138/93 |
| 2,727,471 | 12/1955 | Martin | 277/188 R X |
| 2,767,795 | 10/1956 | Bush | 73/40.5 R |
| 2,870,794 | 1/1959 | Thaxton | 138/90 |
| 3,079,205 | 2/1963 | Hugley | 92/241 |
| 3,152,809 | 10/1964 | Waldrop | 277/212 C |
| 3,294,121 | 12/1966 | Powell et al. | 138/93 X |
| 3,726,319 | 4/1973 | Patterson | 73/49.8 |
| 3,903,730 | 9/1975 | Matthews, Jr. | 138/90 |

Primary Examiner—Daniel M. Yasich
Attorney, Agent, or Firm—William R. Laney

[57] ABSTRACT

A test cup for pressure testing tubing comprising an elastomeric sleeve having a belled end, and further including an axially extending tubular portion positioned concentrically within the belled end and defining therewith a fluid-receiving cavity. The tubular portion is mounted to an internal metallic tube which projects axially into the sleeve beyond the reach of the fluid-receiving cavity in concentric relation to the bore through the sleeve. At its end opposite the belled end, the sleeve has embedded therein a plurality of circumferentially spaced reinforcing ring segments of generally L-shaped cross-section.

5 Claims, 5 Drawing Figures

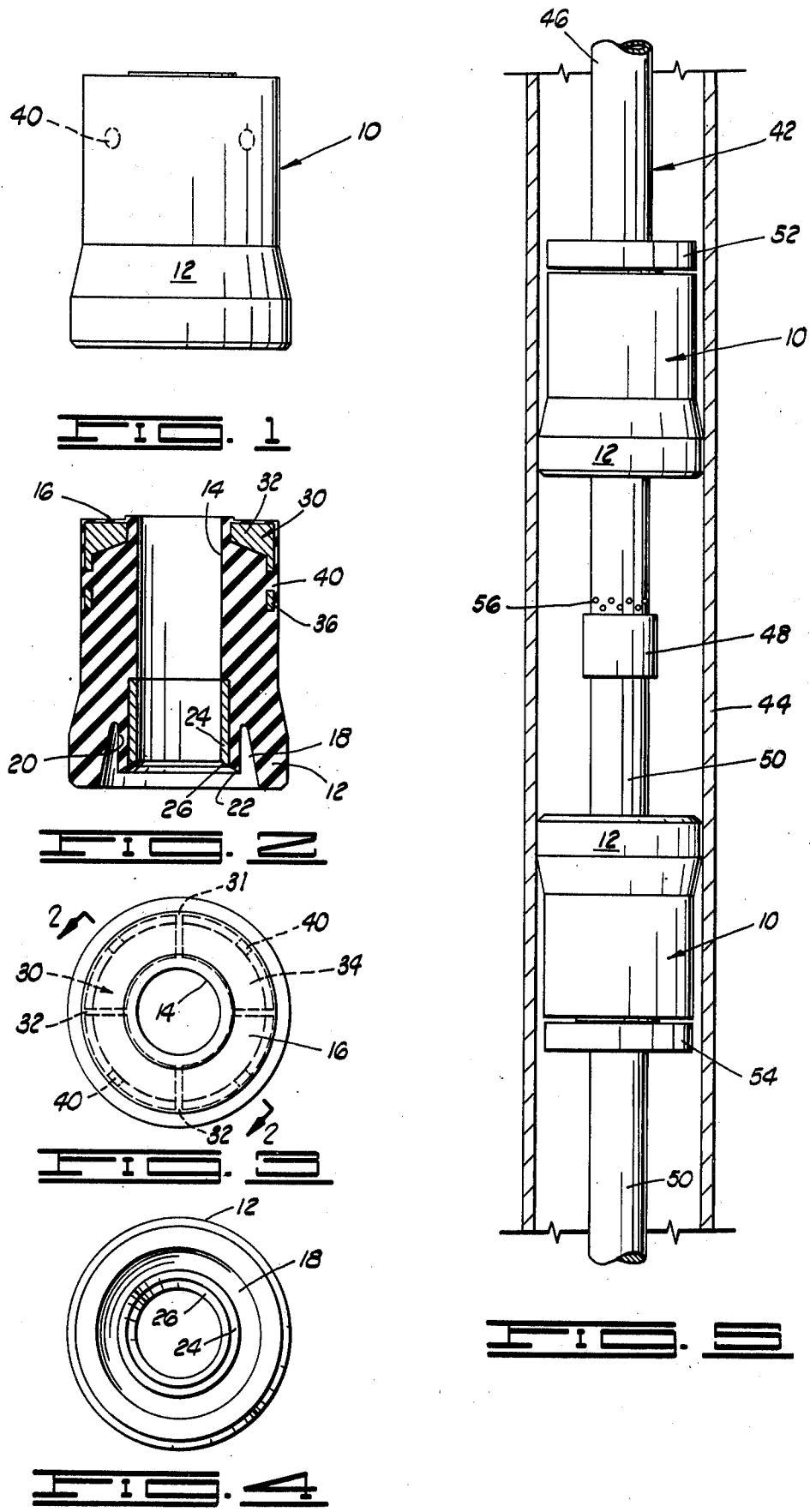

ELASTOMERIC TEST CUP FOR TUBING PRESSURE TESTING

BACKGROUND OF THE INVENTION

1. Field of the Invention

This invention relates to elastomeric or resilient test cups of the type which are positioned internally of tubing to facilitate pressure testing of tubing. The cups enable the establishment of axially spaced seals within the tubing for the purpose of confining a pressurized fluid. More particularly, the invention relates to resilient test cups currently used in association with a testing tool, including a mandril upon which the test cups are located, for testing oil and gas well tubing when the assembled cups and tool are positioned internally of the tubing to be tested.

2. Brief Description of the Prior Art

It is desirable to relatively frequently test tubing used in the drilling of oil and gas wells, and in the production of hydrocarbons from such wells, in order to determine whether the tubing has become fatigued, or has developed pinhole leaks or has in some other way been weakened so as to decrease its capability of satisfactorily conveying high pressure fluids. Pressure testing of tubing by the use of internally applied fluid pressures is one testing technique widely used to determine the continuing integrity, or lack of it, of tubing sections used to make up a downhole string.

Previously, one widely practiced form of pressure testing of tubing has employed a pair of axially spaced test cups made of an elastomeric material and mounted on the mandril portion of a test tool inserted in the tubing section to be tested. The test cups are backed against stops carried on the mandril in opposed relation, and fluid is admitted through a tubular portion of the mandril which is perforated to allow the fluid to fill the space between the test cups. As the fluid thus admitted to the space between the test cups is pressured up, the test cups flare out and undergo expansion so as to form a fluid-tight seal with the internal wall of the tubing under test. Continued increase in the pressure of the fluid between the test cups correspondingly increases the pressure on the walls of the tubing under test so that any propensity to fail under the high pressure thus developed is manifested by the failure of the tubing section, or ejection of the test fluid through pinhole leaks or fractures which may have previously developed in the tubing section.

The elastomeric test cups which have been used in the described testing procedure are subjected to the same high pressures as is the tubing under test. The cups, in being restricted in their ability to move apart from each other, are caused to undergo compression as the fluid pressure is increased and the fluid is prevented from bypassing the test cups by the seal which is effected between the outer periphery of the cups and the internal wall of the tubing section under test. The compression of the elastomeric material of which the cup is constructed has often resulted in an earlier destruction or degradation of the test cup than is optimum, thus greatly reducing the number of test repetitions which can be realized during the service life of each cup, and requiring the use of new test cups after several tests have been run to the point of destruction of the cups first used.

One type of elastomeric test cup which has been used in pressure testing of tubing of the type described is a cup which, in form, is an elastomeric sleeve having a relatively thick or heavy body wall between the bore through the sleeve and the external wall thereof. The elastomeric sleeve is provided with a belled or flared end for the purpose of receiving the pressure fluid, and undergoing flaring or expansion to sealingly engage the adjacent internal wall of the tubing under test. This test cup further includes an internal steel sleeve or tubing section which is positioned concentrically inside the belled end of the test cup, and is bonded to a surrounding sheath or tube of the elastomeric material. At its end opposite the belled end, this previously used cup includes an elastomer-embedded steel washer which extends transversely across the test cup and functions as a back-up member which abuts a stop ring secured around a mandril upon which the test cup is slidably mounted. The stop ring functions to limit axial movement of the test cup under the impress of the pressurized fluid. The steel washer is of substantially the same size as the end face of the test cup which is opposite its belled end, and contains a central opening or aperture corresponding in size to the bore through the elastomeric sleeve.

The rubber or other elastomer employed in the prior art test cup under description is generally of two hardnesses, depending upon the elastomer location in the cup. At that portion of the cup which includes the belled end, the elastomer used is made of relatively softer character, and will typically be of 70 durometer hardness. This enables the belled end of the test cup to more easily undergo flaring and expansion at the time when fluid pressure acts upon the cup, and thus facilitates effective sealing between the outer periphery of the belled end of the cup and the internal wall of the tubing under test. The 70 durometer hardness elastomer in the test cup extends over approximately one-half the length of the cup. The opposite end portion of the cup is made of harder elastomer — typically 90 durometer rubber. It is this portion of the cup which is bonded to the steel washer extending transversely of the cup at its base end opposite the belled end.

In utilizing test cups of the embedded steel washer type for pressure testing tubing, it has been found that such cups are destroyed, or are at least rendered relatively ineffective for test purposes, relatively early in their service life. In a recent pressure test, for example, the cups were fractured and became unsuitable for use so as to require replacement four times during the testing of 1200 feet of tubing sections or joints during an oil well workover. Upon examination of the damaged cups, it was determined that a break or shear plane through the elastomer of the cup existed along a transverse plane extending normal to the axis of the cup at the line of juncture between the relatively soft rubber and the harder rubber. The mating or marriage of the two hardnesses of rubber at this point apparently sets up a plane of weakness within the cup such that fracturing at this location, under the impress of relatively high fluid pressure applied to the cup, occurs relatively easily, and once it has occurred, the susceptibility of the cup to subsequent successful usage is lost.

In another type of test cup which has previously been employed, the steel washer structure located at the end of the test cup opposite its belled end is replaced by a steel cap of U-shaped cross-section. The cap, which is bonded to the rubber in the elastomeric sleeve at this location, has a central hole or aperture in the bottom thereof for registration and alignment with the bore through the elastomeric sleeve. The steel cap employed in this form of test cup includes a cylindrical wall which projects axially toward the belled end of the sleeve over a distance which is about three-quarters of the length of the test cup.

In this type of test cup having a steel cap at one end, all of the elastomer in the sleeve is of uniform hardness and, in order to accommodate the requisite expansion of the belled end of the cup to effect sealing engagement with the tubing under test, is of a relatively soft elastomeric material. Typically, a rubber having a hardness of 70 durometer has been employed.

In the case of this second version of test cup which has previously been used, it has been found that some improvement in the failure rate which is typical and characteristic of the washer-type cup has been realized. Nevertheless, in a shorter time than is desirable, the steel cap-containing test cups must be replaced as a result of fracturing and splitting of the elastomer in the elastomeric sleeve at the point where the metallic cup terminates along the body of the elastomeric sleeve. The reason for fracturing and splitting at this location is not known with certainty, but is believed, from observation, to be the result of the elastomer in the body of the cup forward of the metallic cap undergoing high compression and, in doing so, being forcibly buckled against the end of the metallic cup so as to cause this end of the cap to shear through or cut into the elastomer at this location while the elastomer is under high compression.

BRIEF DESCRIPTION OF THE PRESENT INVENTION

The present invention provides a test cup for pressure testing of tubing utilizing, as an inherent and essential feature of such cup, the conventional belled end on an elastomeric sleeve. The test cup of this invention, however, has been found to outperform test cups of the type previously used, and to have an unusually long and effective service life without the development of fractures or failures in the body of the elastomer constituting the principal portion of the test cup.

Broadly described, the test cup of this invention comprises an elastomeric sleeve which has a belled or flared end located at one of the ends of the sleeve. The belled end encloses a concentrically positioned tubular portion of the elastomer which, by reason of its radial inset from the flared end of the elastomeric sleeve, defines with the flared or belled end of the sleeve, a fluid-receiving cavity. The tubular portion of the elastomer is bonded to the outer periphery of an internal metallic reinforcing tube which projects axially into the elastomeric sleeve beyond the deepest boundary of the fluid-receiving cavity. At its end opposite the belled end of the elastomeric sleeve, the sleeve has embedded therein, a plurality of circumferentially spaced reinforcing ring segments of generally L-shaped cross-section. These segments, in being circumferentially spaced and in not being physically directly connected to each other, can undergo movement in relation to each other as may be required to accommodate fluid pressure, and to allow the breathing or expansion of the elastomeric sleeve as the test cup is utilized for tubing testing.

An important object of the present invention is to provide an improved test cup which can be simply and easily manufactured and is no more expensive to manufacture than test cups of the type previously in use, but which is characterized in having a useful operating life far in excess of that which has been typical of the types of pressure test cups previously employed for tubing testing.

An additional object of the present invention is to provide a test cup for pressure testing tubing, which cup is simple in its construction and can be easily located and used in conjunction with a pressure testing tool internally of segments or joints of tubing used in making up a downhole string employed in oil and gas well drilling, or in the production of hydrocarbons from subterranean strata.

Additional objects and advantages of the present invention will become apparent from the following detailed description of a preferred embodiment of the invention when the same is considered in conjunction with the accompanying drawings which illustrate such preferred embodiment.

GENERAL DESCRIPTION OF THE DRAWINGS

FIG. 1 is a side elevation view of a test cup constructed in accordance with the present invention.

FIG. 2 is a sectional view taken along line 2—2 of FIG. 1.

FIG. 3 is a top plan view of the test cup illustrated in FIG. 1.

FIG. 4 is a bottom plan view of the test cup illustrated in FIG. 1.

FIG. 5 is a view partially in section and partially in elevation showing a set-up employed for the pressure testing of tubing utilizing the test cups of the present invention.

DETAILED DESCRIPTION OF A PREFERRED EMBODIMENT OF THE INVENTION

The test cup of the invention includes an elastomeric sleeve 10 which has at one end thereof a belled or flared end 12. The flared end 12 is of enlarged diameter as compared to the remaining portion of the elastomeric sleeve. The sleeve 10 defines an axial bore 14 which extends centrally through the sleeve from one end thereof to the other. At its end opposite the belled end 12, the sleeve 10 has a planar end face 16 which lies in a plane extending transversely with respect to the axis of the sleeve.

Within the belled end 12 of the sleeve 10, a generally V-shaped fluid-receiving cavity 18 is defined by an axially extending tubular portion 20 of the elastomer. The tubular portion 20 of the elastomer terminates at a location which is spaced axially inwardly from the end of the belled portion 12 of the sleeve, and a tapered seat 22 is formed thereon and faces the opening at the belled end of the sleeve. Concentrically positioned within the tubular portion 20 of the sleeve 10 is a reinforcing tubing section 24 made of steel or similar rigid material. The reinforcing tubing section 24 terminates at its forward end in a tapered seating surface 26 which is conterminus with the end of the tubular portion 22 of the sleeve 10 and is in substantially coplanar alignment with the seating surface 22. The reinforcing tubular member 24 is bonded to the elastomer and is positioned coaxially with respect to the axis of the bore 14 through the sleeve 10.

At the opposite end of the sleeve 10 from the belled end 12, the elastomer of which the sleeve is constructed has embedded therein, a plurality of circumferentially spaced, arcuate reinforcing ring segments designated generally by reference numeral 30. In the embodiment of the invention illustrated in the drawings, four of such reinforcing ring segments 30 are embedded in the elastomer of the sleeve 10. The outline of these ring segments 30 as they appear in plan is shown in dashed lines in FIG. 3, and it will be noted that each of the arcuate ring segments is separated from each of the adjacent ring segments by a portion 31 of the elastomer. The ring segments 30 are thus not in contact with each other, and no two segments are integrated or joined in any way.

Each of the ring segments 30 is of generally L-shaped configuration and includes a transversely extending, relatively thick trapezoidally shaped end flange 32. It will be noted that each ring segment 30 is embedded in the elastomer of the sleeve 10 so that one surface or face 34 of the flange 32 thereof lies in a plane extending normal to the axis of the sleeve 10, and that all of these end faces or surfaces 34 of the end flanges 32 of the ring segments 30 lie in a common plane.

Each ring segment 30 further includes an axially extending flange 36 which is arcuate in transverse cross-section in a curved configuration which is complementary to the cylindrical outer peripheral configuration of the sleeve 10. The axially extending flange 36 of each ring segment 30 projects substantially normal to the trapezoidally configured end flange 32, and projects a distance which is preferably from about one-third to one-half of the total overall length of the elastomeric sleeve 10. The axially extending flange 36 of each ring segment 30 defines a centrally located aperture 40 through which the elastomer is permitted to flow during the molding procedure to provide firmer and more tenacious bonding of the elastomer to and around the respective ring segments.

When test cups constructed in the manner described are to be utilized in pressure testing, they are mounted on a testing tool disposed internally within the tubing to be tested in the manner illustrated in FIG. 5. The testing tools used in conjunction with the test cups will normally include a mandril, designated generally by reference numeral 42, which is sized to pass easily into the tubing 44 to be tested. The mandril will frequently be sectioned to include a hollow tubular portion 46 which is connected by any type of suitable joint or coupling 48 to a solid rod 50. The tubular section 46 of the mandril carries a back-up flange 52 which is fixed on the tubular portion and functions as a stop or abutment against which the base end of the test cup will seat during testing. In similar fashion, a back-up flange 54 is axially keyed to the rod 50, and functions as a back-up member limiting axial movement of the second test cup away from another test cup in the pair which is arrested in its axial movement by the back-up flange 52. The tubular portion 46 of the mandril 42 is provided at a location relatively near to its point of joining to the rod 50 with a plurality of perforations 56 through which fluid under pressure to be used during testing can be admitted to the interior of the tubing 44.

When the testing tool is assembled with the mandril 42 inserted in the tubing 44 to be tested, and with the test cups in position around the respective portions of the mandril, a fluid is introduced through the tubular portion 46 of the mandril, and fills the interior of the tubing 44 between the test cups so as to force the test cups apart and against the back-up flanges 52 and 54. The pressure of the fluid introduced to the interior of the tubing 44 is then increased, with the result that the pressure of fluid acting outwardly on the belled end 12 from within the cavity 18 of each test cup is substantially increased. This causes the belled end 12 of each of the test cups to flare outwardly, firmly sealing against the interior wall of the tubing 44. The pressure of the test fluid is then further increased until a desired magnitude of pressure within the tubing 44 is attained. Once this test pressure is exceeded, if the tubing 44 does not fail, or if a pinhole or previously developed fracture of some type is not revealed by fluid leakage or by loss of pressure, the tubing 44 is considered to have successfully passed the pressure test, and the pressure of the internal fluid can be relieved. The testing tool carrying the test cups can then be removed from the tubing and used in testing additional joints of tubing.

In comparative tests of the test cups of the present invention with cups of the type hereinbefore described and known prior to the present invention, and being of that type having a washer or disk-shaped metallic plate mounted in the base end of the test cup (the end opposite the belled end), the prior art cups of that construction developed destructive fractures, and cup failure resulted about every ten joints. Thus, replacement by new test cups was required four times during the testing of 40 joints of pipe. Each joint was about 30 feet in length so that four cup replacements were required in testing 1200 total feet of tubing or pipe. The same pipe was then subsequently tested after it had been subjected to the same actual conditions in a downhole environment, using the test cups of the present invention. No cup failures occurred, nor was there any apparent deterioration or fracturing of any type developed within the elastomeric sleeve during the testing of the 40 joints previously tested with four pairs of prior art cups. The test cups of the present invention were then further successfully used to test an additional 5800 feet of tubing. Upon completion of the testing of the additional footage of tubing, the test cups of the invention were inspected, and no sign of rubber fracturing or incision of the rubber by any of the metallic structures embedded therein was detected.

The foregoing description and the accompanying drawings illustrate a preferred embodiment of the invention. It will be understood, however, that various changes and innovations in the described structure can be effected without departure from the basic principles which underlie the invention. Thus, although four of the reinforcing ring segments have been illustrated as embedded in the elastomeric sleeve of the test cups of the invention, other numbers of such segments could be used effectively. Moreover, the precise configuration of the belled end of the cup and of the cavity which is defined between this belled end and the concentrically positioned tubular portion of the elastomeric sleeve can be altered, provided only that sealing is effected at the belled end of the cup during the pressure testing sequence. Other rearrangements of structure and changes of relative dimensions can be tolerated successfully within the scope defined by the most basic principles which underlie the invention. Changes and innovations of this type are therefore deemed to be circumscribed by the spirit and scope of the invention, except as the same may be necessarily limited by the appended claims or reasonable equivalents thereof.

What is claimed is:

1. A tubing test cup for pressure testing oil and gas tubing, casing and pipe comprising;
   an elastomeric sleeve having a belled end responsive to fluid pressure for undergoing radial expansion for sealing engagement with a member to be tested, and further having a second end opposite the belled end, said sleeve defining a bore extending axially therethrough between the ends;

a reinforced tubular portion of elastomer formed integrally with the sleeve, and positioned concentrically within, and radially spaced from, the belled end of the sleeve, said tubular portion defining a fluid-receiving cavity with the belled end of the sleeve; and a plurality of circumferentially spaced, arcuate reinforcing ring segments each having a transverse width, as measured in a circumferential direction with respect to the elastomeric sleeve and across the arcuate cross-section of each ring segment, said ring segments being embedded in the elastomeric sleeve adjacent said second end, and in collective array concentrically surrounding the bore through the sleeve, each of said segments being separated from the next adjacent segment by elastomer constituting a portion of the elastomeric sleeve, the elastomer separating adjacent ring segments, and positioned therebetween, having a transverse width, as measured between adjacent ring segments, less than said transverse width of each of said ring segments, said ring segments each being of L-shaped cross-sectional configuration and including an end flange extending substantially normal to the axis of the bore through the sleeve; and an axially extending flange projecting substantially normal to the end flange and secured to the radially outer edge of the end flange at a location adjacent the outer periphery of the elastomeric sleeve.

2. A tubing test cup as defined in claim 1 wherein four of said ring segments are embedded in said elastomeric sleeve and, in collective array, concentrically surround said bore.

3. A tubing test cup as defined in claim 1 wherein each of said ring segments further includes a hole formed through said axially extending flange and having part of the elastomer of said sleeve filling said hole.

4. A tubing test cup as defined in claim 1 wherein each of said end flanges is trapezoidal in cross-section and includes a surface extending parallel to the second end of said elastomeric sleeve.

5. A tubing test cup as defined in claim 4 wherein four of said ring segments are embedded in said elastomeric sleeve and, in collective array, concentrically surround said bore.

* * * * *